(12) United States Patent
Modrie et al.

(10) Patent No.: US 7,145,945 B2
(45) Date of Patent: Dec. 5, 2006

(54) INTERFERENCE-FREE LMS-BASED ADAPTIVE ASYNCHRONOUS RECEIVER

(75) Inventors: David Modrie, Halle (BE); Willem Marie Coene, Geldrop (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/511,808

(22) PCT Filed: Apr. 15, 2003

(86) PCT No.: PCT/IB03/01605

§ 371 (c)(1),
(2), (4) Date: Oct. 19, 2004

(87) PCT Pub. No.: WO03/092201

PCT Pub. Date: Jun. 11, 2003

(65) Prior Publication Data

US 2005/0175128 A1    Aug. 11, 2005

(30) Foreign Application Priority Data

Apr. 23, 2002   (EP) .................... 02291027

(51) Int. Cl.
*H03H 7/30*    (2006.01)
*H04L 27/06*   (2006.01)

(52) U.S. Cl. .................. 375/233; 375/340; 375/355

(58) Field of Classification Search ............ 375/316, 375/232, 233, 229, 230, 377, 322, 340, 355, 375/373, 371, 376; 708/300, 322, 323, 313; 327/298, 141, 151, 156
See application file for complete search history.

(56) References Cited

U.S. PATENT DOCUMENTS

| | | | |
|---|---|---|---|
| 5,228,060 A * | 7/1993 | Uchiyama | 375/316 |
| 5,838,744 A * | 11/1998 | Zheng | 375/355 |
| 5,999,355 A | 12/1999 | Behrens et al. | 360/65 |
| 6,278,730 B1 * | 8/2001 | Tsui et al. | 375/224 |
| 6,381,085 B1 * | 4/2002 | Du et al. | 360/65 |
| 6,912,258 B1 * | 6/2005 | Birru | 375/340 |
| 6,975,689 B1 * | 12/2005 | McDonald et al. | 375/316 |
| 2002/0037058 A1 * | 3/2002 | Birru | 375/340 |
| 2005/0002474 A1 * | 1/2005 | Limberg | 375/321 |

\* cited by examiner

*Primary Examiner*—Tesfaldet Bocure
(74) *Attorney, Agent, or Firm*—Michael E. Belk

(57) ABSTRACT

The invention relates to an interference-free LMS-based asynchronous receiver for digital transmission and recording systems. The receiver, having an asynchronously placed LMS-based adaptive equalizer, has 2 control loops: a timing recovery loop (by means of, for instance a PLL (Phase locked loop) and an equalizer's adaptation loop. Interference between the two loops is avoided by deriving a condition the equalizer should fulfill to avoid the interference between the two loops, which implies "orthogonal control functionality" and by combining the condition with the equalizer's adaptation loop. The equalizer shall adapt so that the condition is always true.

8 Claims, 5 Drawing Sheets

US 7,145,945 B2

INTERFERENCE-FREE LMS-BASED ADAPTIVE ASYNCHRONOUS RECEIVER

This application is a 371 of PCT/IB03/01605 Apr. 15, 2003.

FIELD OF THE INVENTION

The invention generally relates to digital transmission and recording systems. In particular, it relates to a receiver for delivering a data sequence $a_k$ at a data rate 1/T from a received sequence $r_n$ sampled at a clock rate 1/Ts, asynchronous to the data rate 1/T.

The invention also relates to a digital system comprising a transmitter for transmitting a digital sequence via a channel and a receiver for extracting said digital sequence from said channel, wherein said receiver is a receiver as described above. The invention further relates to an equalizer adaptation method for said receiver. It finally relates to a computer program product for such a receiver and to a signal for canying said computer program.

The invention applies to a wide variety of asynchronous receivers for use in digital transmission and recording systems. It is particularly advantageous in high density/capacity optical disc systems such as the Blu-ray Disc system (BD).

BACKGROUND ART

U.S. Pat. No. 5,999,355 describes an asynchronous receiver such as the one mentioned in the opening paragraph. In accordance with the cited patent, the equalizer is a tapped delay line (Finite Impulse Response filter) with a tap spacing of Ts seconds. Control of the equalizer is based on the classical LMS (Least Mean Square) algorithm; that is to say, correlating the tap sequences with a suitable engr sequence produces updates of the equalizer tap values. Classical LMS techniques normally apply to synchronous receivers wherein error and tap sequences have the same sampling rate and are phase synchronous. The asynchronous receiver described in the cited patent thus comprises at Least two provisions in order that error and tap sequences have the same sampling rate and are phase synchronous. The latter condition implies that any latency in the error sequence should be matched by delaying the tap sequences accordingly. The aforementioned two provisions include an inverse sampling rate conversion (ISRC) for converting the synchronous ewor sequence at the data rate 1/T into an equivalent error sequence of sampling rate 1/Ts. The receiver, having an asynchronously placed LMS-based adaptive equalizer, has two control loops: a U.S. Pat. No. 5,999,355 describes an asynchronous receiver such as the one mentioned in the opening paragraph. In accordance with the cited patent, the equalizer is a tapped delay line (Finite Impulse Response filter) with a tap spacing of Ts seconds. Control of the equalizer is based on the classical LMS (Least Mean Square) algorithrti; that is to say, correlating the tap sequences with a suitable error sequence produces updates of the equalizer tap values. Classical LMS techniques normally apply to synchronous receivers wherein error and tap sequences have the same sampling rate and are phase synchronous. The asynchronous receiver described in the cited patent thus comprises at least two provisions in order that error and tap sequences have the same sampling rate and are phase synchronous. The latter condition implies that any latency in the error sequence should be matched by delaying the tap sequences accordingly. The aforementioned two provisions include an inverse sampling rate conversion (ISRC) for converting the synchronous error sequence at the data rate 1/T into an equivalent error sequence of sampling rate 1/Ts. The receiver, having an asynchronously placed HISbased adaptive equalizer, has two control loops: a timing recovery loop or PLL (Phase locked loop) and an equalizer's adaptation loop. Unless precautions are taken, the two loops can interfere with each other, which may lead to instability.

SUMMARY OF THE INVENTION

It is an object of the invention to provide an asynchronous receiver using an alternative adaptation topology that circumvents the disadvantage mentioned above. In accordance with the invention, a receiver as mentioned in the opening paragraph is provided, comprising:

an adaptive equalizer (EQ) for delivering an equalized sequence $(y_n)$ from said received sequence $(r_n)$, said equalizer operating at the clock rate 1/Ts and being controlled via an equalizer's adaptation loop, a sampling rate converter (SRC1) for converting said equalized sequence $(y_n)$ into an equivalent input sequence $(x_k)$ to be provided to an error generator (21) at the data rate 1/T via a timing recovery loop, an error generator (21) for delivering, from said input sequence $(x_k)$, the data sequence $(a_k)$ and an error sequence $(e_k)$ to be used in both loops, orthogonal control functionality means (40) for deriving a condition for the adaptive equalizer (EQ) to fulfill in order to decrease interference between said equalizer's adaptation loop and said timing recovery loop.

In this way, the interference is avoided between the two loops by deriving a condition the equalizer should obey in order to delete the interference between the two loops, which implies "orthogonal control functionality" and by combining the condition with the equalizer's adaptation loop. The equalizer shall adapt so that the condition is always true. With the orthogonal control functionality means, the equalizer is adapted by the equalizer's adaptation controlling algorithm (based on Least Mean Square algorithm or LMS for instance) such that the orthogonal control functionality condition is obeyed, resulting in an interference-free system.

BRIEF DESCRIPTION OF THE DRAWINGS

The invention and additional features, which may be optionally used to implement the invention, are apparent from and will be elucidated with reference to the drawings described hereinafter and wherein.

DETAILED DESCRIPTION OF THE DRAWINGS

The following remarks relate to reference signs. Identical block labels in all Figures usually indicate the same functional entities. In the sequel, we will also adopt the convention that vectors are denoted by underlined symbols, and that the symbols k and n refer to sequences of sampling rates 1/T and 1/Ts, respectively. For example, according to this convention the notation $a_k$ refers to a scalar sequence of sampling rate 1/T, and the notation $S_n$ refers to a vector sequence of sampling rate 1/Ts. The length of a vector will be denoted by the symbol N with a subscript indicating the symbol used for the vector. Accordingly, for example, the length of the vector $S_n$ is denoted $N_s$.

Figure 1:
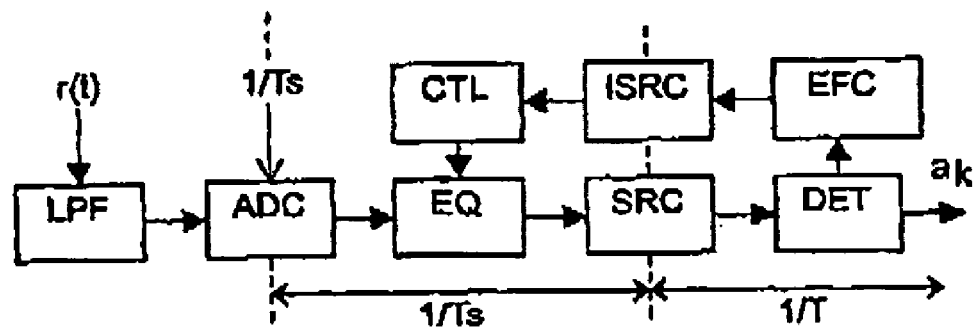
FIG. 1 is a functional block diagram illustrating a generic asynchronous receiver topology for use in digital transmission and recording systems.

FIG. 1 illustrates a generic topology of an asynchronous base-band receiver for digital transmission and recording systems. The receiver generates a data sequence $a_k$ at a data rate 1/T from a received signal r(t). The received signal r(t) is applied to an analog low pass filter LPF whose main function is to suppress out-of-band noise. An analog-to-digital converter ADC, which operates at a crystal-controlled free-running sampling rate 1/Ts, asynchronous to the data rate 1/T, which is high enough to prevent aliasing, digitizes the LPF output. The ADC output is applied to an equalizer EQ which serves to condition inter-symbol interference and noise. The equalizer operates at the sampling rate 1/Ts, i.e. asynchronously to the data rate 1/T. A sampling-rate converter SRC produces an equivalent synchronous output which serves as the input of a bit detector DET for delivering the data sequence $a_k$. The SRC forms part of a timing-recovery loop (TRL), which is not depicted explicitly in FIG. 1. Asynchronous and synchronous clock domains are indicated in FIG. 1 with the symbols 1/Ts and 1/T, respectively.

To cope with variations of the system parameters, the equalizer EQ often needs to be adaptive. To this end, error information is extracted from the bit detector DET by an error formation circuit EFC and is used to control (update) the equalizer taps via a control module CTL. This forms an equalizer's adaptation loop (EAL). Error formation occurs in the synchronous (1/T) clock domain, while control necessarily occurs in the asynchronous (1/Ts) domain. In between, an inverse sampling-rate converter ISRC is required. In practice, the equalizer is often a tapped delay line (Finite Impulse Response filter) with a tap spacing of Ts seconds.

Existing asynchronous adaptation techniques are based on LMS (Least Mean Square) algorithms. With LMS, cross-correlating the tap sequences with a suitable error sequence derives updated information for the equalizer taps. For this to work, the tap and error signals need to be synchronous both in sampling rate and in phase. The first condition is met via the ISRC. The second one requires that the total latency of SRC, bit-detector, error formation circuit, and ISRC is matched by delaying the tap signals accordingly, prior to cross-correlation. Both ISRC and delay matching add to the complexity of the solution. Delay matching, moreover, may not be accurate because of the time-varying nature of the latency of SRC and ISRC. As a result, adaptation performance may degrade.

Figure 2:
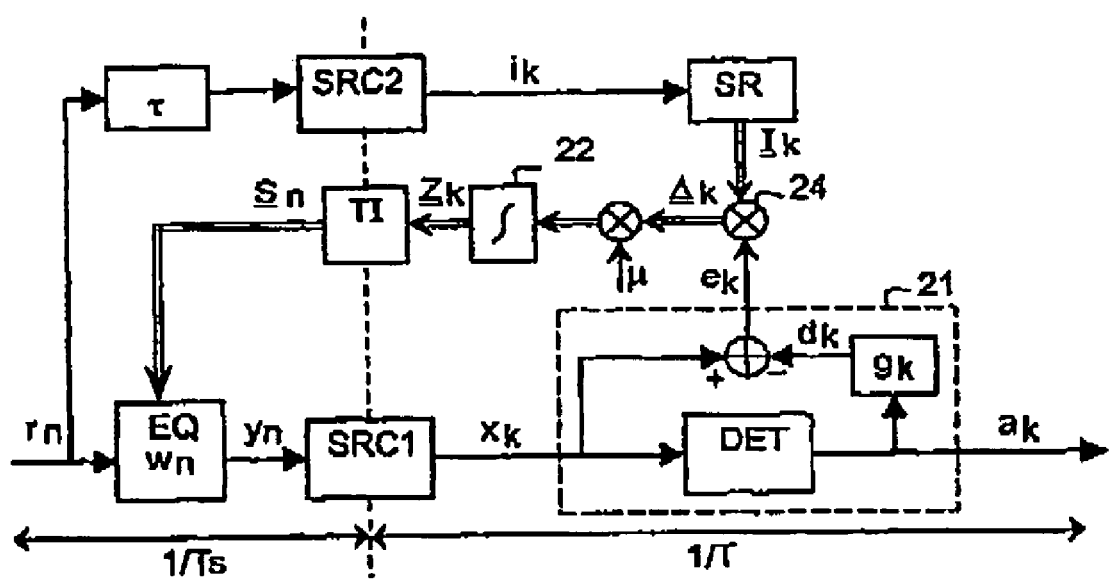
FIG. 2 is a functional block diagram illustrating an example of an asynchronous LMS-based receiver topology.

FIG. 2 shows an example of a receiver comprising an adaptation topology that overcomes the disadvantages mentioned before. Only a portion of the data receiver is shown in FIG. 2, namely the portion relevant to digital equalizer adaptation. In particular, the timing-recovery subsystem of the receiver, which controls the sampling-rate converter SRC and the temporal interpolation means TI, is not shown. The receiver comprises an adaptive equalizer EQ, a pair of sampling-rate converters SRC1 and SRC2, and a detector DET to produce a data sequence $a_k$ from a received input sequence $r_n$. The detector DET is part of an error generator 21 which generates an error sequence $e_k$ to be used in the equalizer's control loop from the bit decisions generated by the bit detector. Adaptation of the equalizer is based on LMS techniques as described, for example, in J. W. M. Bergmans: "Digital Baseband Transmission and Recording", published by Kluwer Academic Publishers, Boston, 1996, denoted [ref.]. Central to these techniques is that tap update information is produced by correlating the tap signals (received sequence $r_n$) with the error signals. Error and tap signals should have the same sampling rate, and should moreover be phase synchronous; any latency in the error signal should be matched by delaying the tap signals accordingly.

In FIG. 2, $r_n$ denotes the sequence obtained by periodic sampling of, for example, an analog replay signal from a recording channel. Sampling is performed at a free-running clock rate 1/Ts which is generally not equal to the data rate 1/T. The sequence $r_n$ is passed through an equalizer EQ having Ts-spaced taps $w_n$ for producing an equalized sequence $y_n$ at its output. Preferably, the equalizer EQ is an FIR (Finite Impulse Response) transversal filter, but it may be any equalizer that contains a linear combiner. The purpose of the equalizer is to shape the response of the (for example recording) channel to a prescribed target response and to condition the noise spectrum. The equalizer EQ is followed by a sample rate converter SRC which transforms the Ts-spaced equalized sequence $y_n$ into an equivalent T-spaced sequence $x_k$ to be provided at the input of an error generator 21 comprising a bit detector DET. The T-spaced input sequence $x_k$ is ideally synchronous to the data rate 1/T of the channel data sequence $a_k$. Actually, the bit detector DET produces estimates $\hat{a}_k$ of the channel bits $a_k$. Assuming that the bit detector produces correct decisions, the data sequence $a_k$ and its estimate $\hat{a}_k$ are identical. Therefore, the outputs of the bit detector are denoted $a_k$ in all Figures. Occasional bit errors do not significantly affect the performance of the system. Alternatively, at the beginning of transmission, a predetermined data sequence (often referred to as preamble) may precede the actual data in order for initial adaptation to be based on a replica of this predetermined data sequence, which may be synthesized locally in the data receiver without any bit errors. It is common practice to perform the initial stage of adaptation in this so-called 'data-aided' mode of operation, and to switch to the 'decision-directed' mode of operation as depicted in FIG. 2 once adaptation loops have converged. Though not depicted explicitly in FIG. 2, it is to be understood that the present description also pertains to this 'data-aided' mode of operation.

The remaining part of FIG. 2 illustrates the mechanism of the control loop for adaptively updating the equalizer tap coefficient vector sequence $W_n$ using LMS techniques. All digital operations involved in the control loop can be realized, for example, by a microprocessor carrying out a suitable computer program. The double-line arrows between blocks indicate vector signals transfers while single arrows indicate scalar signals. Therefore, the control loop (equalizer's adaptation) comprises:

a second sampling rate converter SRC2 for converting a delayed version of the received sequence $r_n$ into an intermediate control sequence $I_k$ at the data rate 1/T, this second SRC, denoted SRC2, being preferably the same as the first SRC1, control information production means 22 for deriving a synchronous control vector sequence $Z_k$ at the data rate 1/T, from the error sequence $e_k$ and the intermediate control sequence $i_k$, and temporal interpolation means TI for deriving the control vector sequence $S_n$ from said synchronous control vector sequence $Z_k$.

In FIG. 2, the control vector sequence $S_n$ directly controls the equalizer, i.e. the equalizer tap vector sequence $W_n$ simply coincides with $S_n$. The synchronous control vector sequence $Z_k$ produced by the control information production means is formed by a bank of Nz integrators 22, whose input is derived from a cross product 24 $e_k \cdot I_k$, where $I_k$ is an intermediate vector sequence consisting of Ni intermediate sequences. All the vector lengths are equal. Therefore, Nz=Ni=2M+1, the number 2M+1 being the number of taps $w_n$ in the equalizer EQ. This intermediate vector sequence $I_k$ is derived from the received sequence $r_n$. A predefined delay τ is applied to the received sequence $r_n$. The delayed version of the received sequence $r_n$ is provided to a sampling rate converter SRC2 to form an intermediate sequence $i_k$, prior to a shift register SR performing a serial to parallel conversion to form the intermediate vector sequence $I_k$ from the intermediate sequence $i_k$.

The input of the equalizer is thus converted to the data rate domain after it has been delayed with a predefined delay. The predefined delay does not vary with time and is well known. It is equal to the amount of delay from the input of the equalizer to the output. Once both signals, i.e. the signals at the output of each sampling rate converter, are in the data rate domain, the equalizer coefficient updates can be easily computed. The adaptation scheme will be detailed below.

The variables at the output of the integrators 22, denoted $z_k^j$, obey the following equation:

$$z_{k+1}^j = z_k^j + \mu \Delta_k^j, \; j: -M, \ldots, M \quad (1)$$

where:

$z_k^j$ is the output of the j-th integrator at instant k,

μ is a small scaling factor (often referred to as step size) which determines closed-loop time constants, $\Delta_k^j$ is a tap-error estimate at iteration k, and 2M+1 is the number of taps of the equalizer.

According to the LMS scheme, the estimate $\Delta_k^j$ is given by:

$$\Delta_k^j = e_k \cdot i_{k-j}, \; j: -M, \ldots, M \quad (2)$$

where:

$e_k$ is the error between the SRC output and a (delayed version of) the desired detector input $d_k = (a*g)_k$, with:

$g_k$ the target response (of a filter G) for the equalizer adaptation $i_{k-j}$ is a delayed version of the received sequence $r_n$ converted into the data rate 1/T.

For the sake of completeness it is mentioned that equation (2) and FIG. 2 describe only one of the various possible manners to derive tap-error estimates $\Delta_k^j$ from the error sequence $e_k$ and the input sequence $r_n$. For example, both of the two sequences $e_k$ and $r_n$ may be strongly quantized so as to simplify implementation, and the multiplication in (2) may be replaced by a selective-update mechanism.

FIG. 2 shows that the synchronous control vector sequence $Z_k$ at the output of the integrators is updated every T seconds (synchronous domain), while the equalizer coefficient vector $W_n$ needs to be updated every Ts seconds, since the equalizer operates in the asynchronous domain. The necessary time-base conversion is performed through the temporal interpolation means TI for deriving an asynchronous control vector sequence $S_n$ at the sampling rate 1/Ts from the synchronous control vector sequence $Z_k$ at the output of the bank of integrators. Since tap values change only slowly with respect to both sampling rates, the temporal interpolation can be done in the simplest conceivable manner, for example, via a bank of latches performing zeroth-order interpolation. When $T_s$ deviates too much from T, an additional issue is raised, which requires an additional functionality, called spatial interpolation. The additional functionality is described with reference to FIG. 3.

The equalizer has a tap spacing of Ts seconds, i.e. it acts to delay the input sequence in steps of Ts seconds to obtain the successive tap signals, which are then combined linearly with weights $w_n^j$, j: -M, . . . ,M, that are defined by the coefficient vector sequence $W_n$. The control vector sequence $s_n$ at the output of the bank of integrators, however, pertains to a T-spaced equalizer, i.e. successive components $s^j$, j: -M, . . . ,M, of $s_n$ are meant in principle as weighting factors for an equalizer with tap spacing T. The discrepancy between this nominal tap spacing of T seconds and the actual tap spacing of Ts seconds results in a degradation of adaptation performance, both in terms of the steady-state solution at which the equalizer settles and in terms of a degradation of loop efficiency. As a result, the topology of FIG. 2 is mainly suitable for near-synchronous applications, for example, applications in which 1/Ts and 1/T are close to each other, and preferably differ by less than approximately 20 s⁻. This condition is met in many practical systems, for example, in most channel ICs (Integrated Circuits) for hard disk drivers (optical storage).

Figure 3:
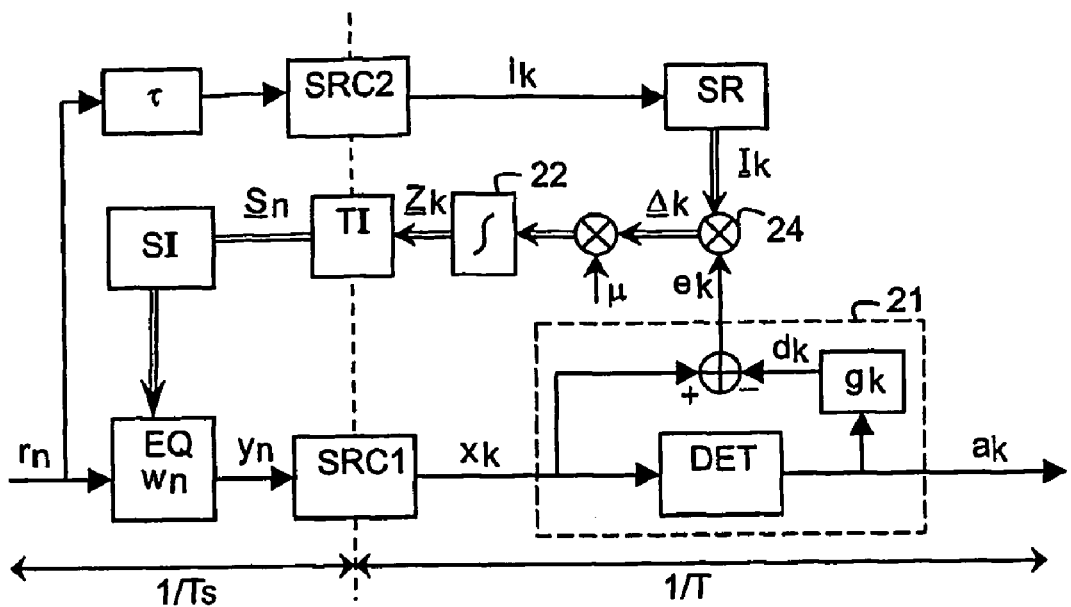
FIG. 3 is a functional block diagram illustrating a further example of a receiver in accordance with an asynchronous LMS-based topology.

In order to be able to use the invention within a larger range of applications, an improvement of the scheme described in FIG. 2 is proposed in FIG. 3. According to this improvement, the control loop further comprises spatial conversion means for deriving the equalizer coefficient vector sequence $W_n$ from the asynchronous control vector sequence $S_n$ at the output of the temporal interpolation means. As a result, an initially T-spaced sequence generated within the control loop is converted into an equivalent Ts-spaced sequence for controlling the equalizer coefficient vector $W_n$. In FIG. 3, these spatial conversion means are indicated with the symbol SI. Since the update variables $s_n^j$ describe the coefficients of a T-spaced equalizer, it is indeed necessary to convert this T-spaced information into Ts-spaced information. This necessitates interpolation on the coefficients $s^j$, which is performed by the Spatial Interpolator block SI. Conceptually, the update variables $s^j$ are T-spaced samples of an underlying time-continuous equalizer filter whose impulse response is denoted w(t), i.e. $s^j = w^j = w(jT)$, j: -M, . . . ,M. Assuming that w(t) were available, we would have to resample it at positions $t_i = i \times Ts$, for i: -M, . . . ,M, in order to generate the necessary equalizer coefficients $w^i = w(i \times Ts)$. The variable t here does not indicate time but position, and assumes continuous values from a certain interval (the span of the filter). In the same sense, i is a position index that is independent of time, i.e. $t_i$ is fully determined by i and does not change over time. However, since only T-spaced samples of w(t), namely $s^j$, are available, interpolation of these samples must be used to produce the Ts-spaced variables $w^i$.

One of the simplest forms of interpolation is linear interpolation, which is attractive from a computational point of view, but other forms of interpolation may be considered such as, for example, nearest-neighbor interpolation, which is even simpler. The re-sampling positions $t_i = i \times T_s$ can be equivalently written as $t_i = (m_i + c_i)T$, where $0 \leq c_i < 1$, and $$m_i = \left[i\frac{T_s}{T}\right], c_i = i\frac{T_s}{T} - m_i. \quad (3)$$

As $c_i$ varies between 0 and 1, $t_i$ varies between $m_iT$ and $(m_i+1)T$, and w(t) varies between $w(m_iT)=s^{m_i}$ and $w((m_i+1)T)=s^{m_i+1}$. According to one method of linear interpolation, the value of w(t) at position $t_i$ is then calculated as:

$$w_i = w(t_i) = (1-c_i) \times s^{m_i} + c_i \times s^{m_i+1} \quad (4)$$

With the aid of (4), the spatial interpolator SI of FIG. 3 converts the T-spaced taps $s^i$ at the output of the latch to Ts-spaced tap settings $w^i$ representing the equalizer taps. In order to perform this conversion it is necessary to know, or estimate, the ratio Ts/T of the channel bit rate to the sampling rate as indicated in equation (3). However, an estimate of this ratio is already available within the sampling rate converter SRC1 of FIG. 3. The SRC re-samples the Ts-spaced sequence $y_n$ at instants $t_k=kT$, which can be re-written as $t_k=(m_k+\mu_k)Ts$.

In the presence of phase errors, the difference between successive sampling instants varies from the nominal value of T according to $t_k - t_{k-1} = T + \tau_k T$, where $\tau_k$ is a phase error in the reconstructed T-spaced clock. Then we arrive at the following equation:

$$(m_k - m_{k-1}) + (\mu_k - \mu_{k-1}) = \frac{T}{T_s} + \tau_k \frac{T}{T_s} \quad (5)$$

The timing-recovery loop that controls the SRC1 acts to force the average of the phase error to zero. Therefore, the average of the quantity on the left-hand side of (5) will settle on the actual value of T/Ts, or the inverse of the ratio that is needed for linear interpolation.

For the adaptive equalizer of FIG. 3 solutions are needed in order to realize "orthogonal" control functionality of the timing recovery loop or PLL and the equalizer's adaptation loop. Time-shifts in the impulse response of the FIR filter (Finite Impulse Response filter) of the equalizer (EQ), which occur as offsets in the "group delay" are fully compensated by the timing recovery loop. The "group delay" indicates the derivative of the phase characteristic of the filter. As a result the error $e_k$ is independent of the offset in the group delay, which may lead to divergence. In order to avoid interference between the timing recovery and the equalizer's adaptation loop, the impulse response of the adaptive equalizer must not contain a linear phase term in frequency v, which is called an orthogonal functionality condition. In fact, the PLL should be solely responsible for the correction of linear phase term distortions and the adaptive equalizer for all higher-order phase distortions, for example, in optical storage systems, like $v^2$ for a defocus term, $v^3$ for a tilt or coma term, $v^4$ for a residual spherical aberration term due to low-frequency variations in the cover layer thickness, for example.

Figure 4:
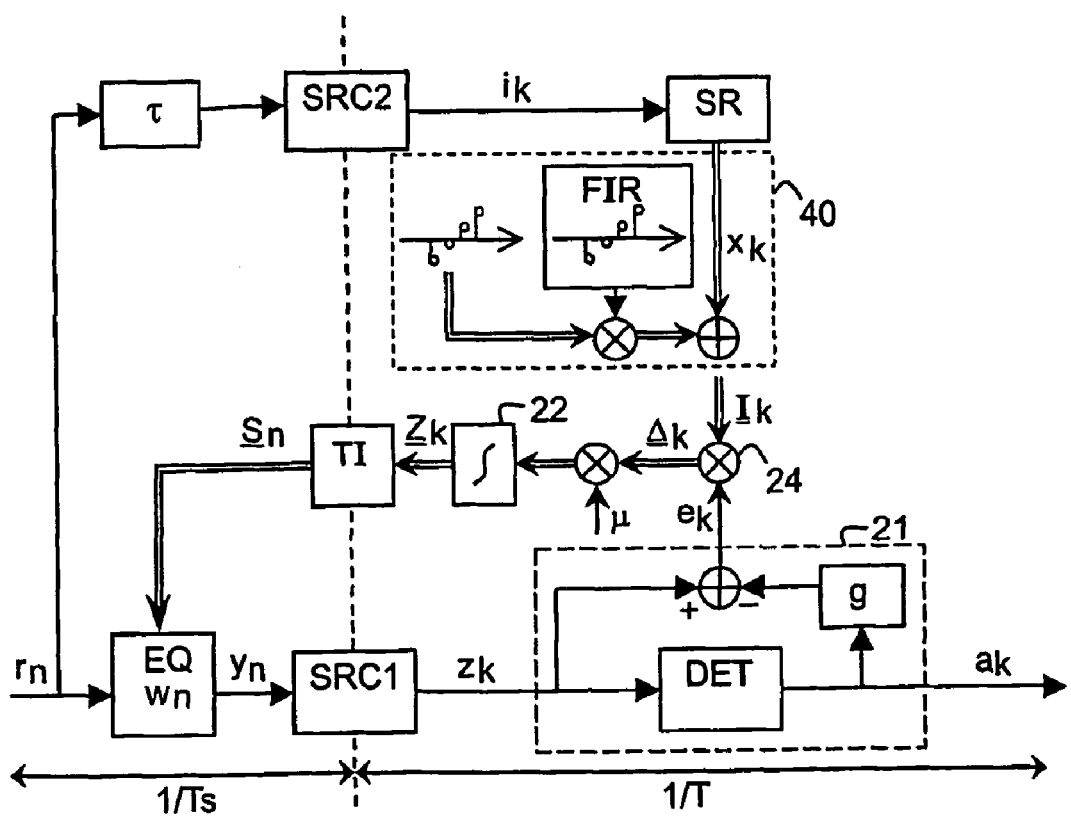
FIG. 4 is a functional block diagram illustrating a receiver topology in accordance with a first embodiment of the invention.

The novel LMS-based asynchronous equalizer with orthogonal control functionality extension adapts the equalizer in accordance with the equalizer's control algorithm, for example, of the LMS type, provided that the condition defined above is fulfilled in every adaptation step. A receiver in accordance with a first embodiment of the invention is illustrated in FIG. 4. In the topology of FIG. 4, we assume that Ts is almost equal to T. Same functional entities as in FIGS. 2 and 3 are indicated by same letter references. The new receiver comprises orthogonal control functionality means to derive a condition the equalizer should obey in order to decrease interference between the two loops. The equalizer shall adapt so that the condition is always true.

The derivation orthogonal functionality condition is explained below. Let us denote the transfer function of the FIR filter $w_k$ by W(v):

$$W(v) = \sum_k w_k \exp\{2\pi i v k\} \quad (-0.5 \leq v \leq 0.5)$$
$$= A(v)\exp\{i\varphi(v)\}$$

The phase $\varphi(v)$ must not contain terms linear in v, the group delay offset must be constrained:

$$\left.\frac{d\varphi(v)}{dv}\right|_{v=0} = 0$$

Further, we know that, since the equalizer coefficients $w_k$ are real, we have for A(v):

$$A(-v) = A(v)$$

And thus also that $$\left.\frac{dA(v)}{dv}\right|_{v=0} = 0$$

Since $$\frac{dW(v)}{dv} = \frac{dA(v)}{dv}\exp\{i\varphi(v)\} + i\frac{d\varphi(v)}{dv}W(v)$$

Combining the equations results in:

$$\left.\frac{dW(v)}{dv}\right|_{v=0} = 0$$

Which is equivalent to:

$$\sum_k k w_k = 0$$

A filter that leaves linear phase terms untouched should have taps $w_k$ obeying this constraint. To prevent the interference between the equalizer adaptation loop and the tiring recovery, the objective of the filter adaptation algorithm must be altered to minimize the mean square error power J, where E[x] indicates the expectation value of the statistical variable x:

$$J(k) = E[e_k^2]$$

(Basic Least Mean Square (LMS) algorithm) subject to the additional condition:

$$\sum_k k w_k = 0$$

This results in a new cost function (the criterion, which is to be minimized by the adaptation is called the cost function), where $\tilde{J}(k)$ means:

$$\tilde{J}(k) = J(k) + \lambda \cdot \left( \sum_k k w_k \right)$$

where $\lambda$ is a Lagrange multiplier. This multiplier must be chosen such that $\tilde{J}(k)$ is minimized as a function of the filter taps $w_p$:

$$\tilde{\nabla}_p(k) = \frac{\partial \tilde{J}(k)}{\partial w_p} = 0 \; \forall \; p$$

or $$\tilde{\nabla}_p(k) = \lambda \cdot p + 2 \cdot E\left[ \left( \sum_j x_{k-j} w_j - \sum_j g_{k-j} \hat{a}_j \right) \cdot x_{k-p} \right] = 0 \; \forall \; p$$

To determine $\lambda$, the energy in $$\sum_p \tilde{\nabla}_p(k)^2$$

must be minimized:

$$\frac{\partial}{\partial \lambda}\left( \sum_p \tilde{\nabla}_p(k)^2 \right) = \sum_p p \cdot \tilde{\nabla}_p(k) = 0$$

Resulting in:

$$\lambda = \frac{-2 \cdot E\left[ \left( \sum_j x_{k-j} w_j - \sum_j g_{k-j} \hat{a}_j \right) \cdot \sum_a n x_{k-a} \right]}{\sum_n n^2} = \frac{-2 \cdot E\left[ e_k \cdot \sum_n n x_{k-n} \right]}{\sum_n n^2}$$

where $\hat{a}_k$ stands for the decisions on $a_k$.

The equalizer adaptation loop must now solve the equation:

$$\tilde{\nabla}(k) = \frac{\partial \tilde{J}(k)}{\partial \overline{w}(k)} = \left( \frac{\partial \tilde{J}(k)}{\partial w_k(k)}, \ldots, \frac{\partial \tilde{J}(k)}{\partial w_k(k)} \right) \to 0$$

Iteratively, by using the steepest-descent method:

$$w_p(k+1) = w_p(k) - \mu \tilde{\nabla}_p(k)$$

-continued resulting in:

$$\tilde{\nabla}_p(k) = \frac{\partial \tilde{J}(k)}{\partial w_p(k)} = E\left[ 2 \cdot e_k \cdot \frac{\partial e_k}{\partial w_p(k)} \right] + \frac{-2 \cdot p \cdot E\left[ e_k \cdot \sum_n n x_{k-n} \right]}{\sum_n n^2}$$

$$= 2 \cdot E[e_k \cdot x_{k-p}] + \frac{-2 \cdot p \cdot E\left[ e_k \cdot \sum_n n x_{k-n} \right]}{\sum_n n^2}$$

From the practical point of view the steepest descent update mentioned above is not computable: the expectation instruction requires an average computation over a very long period. Therefore, the gradient is replaced by an instantaneous gradient, which gives:

$$w_p(k+1) = w_p(k) - 2 \cdot \mu \cdot e_k \cdot x_{k-p} + 2 \cdot \mu \cdot p \cdot e_k \cdot \frac{\sum_n n x_{k-n}}{\sum_n n^2}$$

This altered LMS algorithm will minimize the average mean square error power. Instead of the power, one may seek to minimize the average absolute value of the error:

$$\tilde{\nabla}_p(k) = \frac{\partial \tilde{J}_{ll}(k)}{\partial w_p(k)} = E\left[ 2 \cdot \text{sign}(e_k) \cdot \frac{\partial e_k}{\partial w_p(k)} \right] + \frac{-2 \cdot p \cdot E\left[ \text{sign}(e_k) \cdot \sum_n n x_{k-n} \right]}{\sum_n n^2}$$

$$= 2 \cdot E[\text{sign}(e_k) \cdot x_{k-p}] + \frac{-2 \cdot p \cdot E\left[ \text{sign}(e_k) \cdot \sum_n n x_{k-n} \right]}{\sum_n n^2}$$

leading to a new sign-algorithm:

$$w_p(k+1) = w_p(k) - 2 \cdot \mu \cdot \text{sign}(e_k) \cdot x_{k-p} + 2 \cdot \mu \cdot p \cdot \text{sign}(e_k) \cdot \frac{\sum_n n x_{k-n}}{\sum_n n^2}$$

The multiplication by $\text{sign}(e_k)$ involves only sign reversals and is thus significantly simpler. As a sanity check, the condition for the orthogonal control functionality of the timing recovery and the equalizer adaptation loop shall be evaluated:

$$\sum_k k w_k = 0$$

for the algorithm:

$$w_p(k+1) = w_p(k) - 2 \cdot \mu \cdot e_k \cdot x_{k-p} + 2 \cdot \mu \cdot p \cdot e_k \cdot \frac{\sum_n nx_{k-n}}{\sum_n n^2}$$

The increment does obey the condition:

$$\sum_p p \cdot \left( -2 \cdot \mu \cdot e_k \cdot x_{k-p} + 2 \cdot \mu \cdot p \cdot e_k \cdot \frac{\sum_n nx_{k-n}}{\sum_n n^2} \right) =$$

$$2 \cdot \mu \cdot e_k \cdot \left( \sum_p px_{k-p} - \sum_p p^2 \cdot \frac{\sum_n nx_{k-n}}{\sum_n n^2} \right) = 0$$

The same check can be done for the sign-algorithm, leading to a similar result.

Figure 5A:
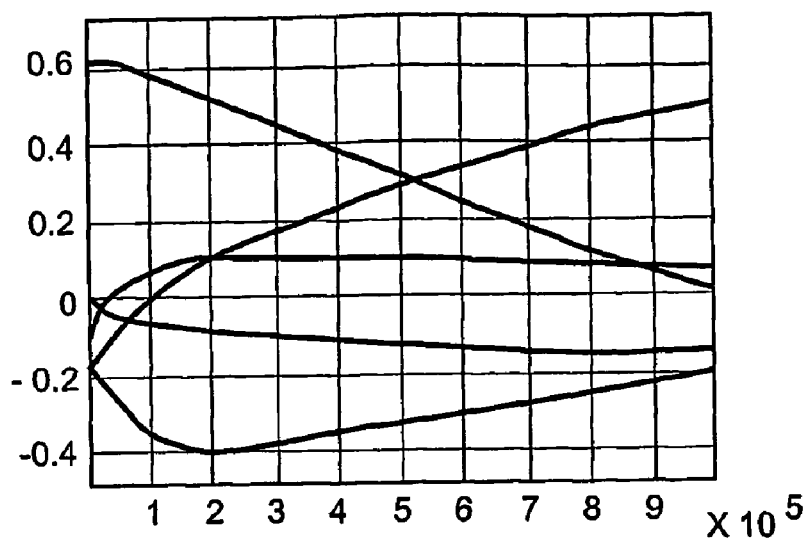
FIG. 5a and FIG. 5b are graphs illustrating simulation results relating to the receivers of FIGS. 3 and 4, respectively.
Figure 5B:
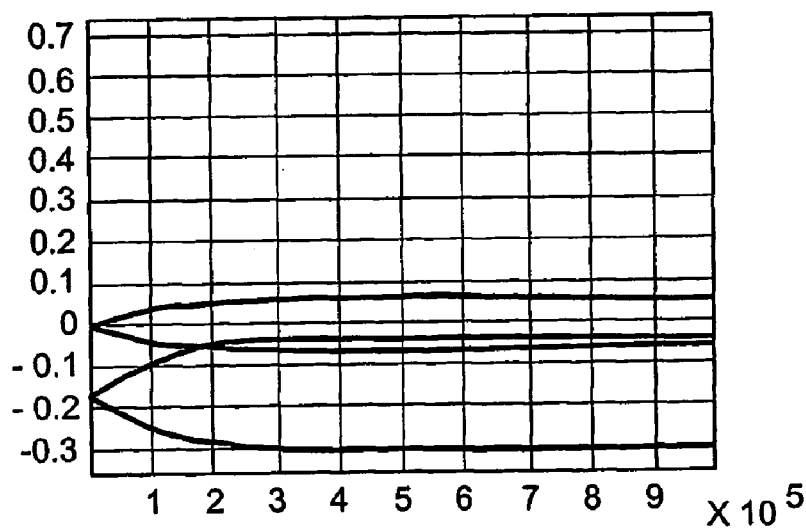

FIG. 5 illustrates simulation results showing the gradient of the equalizer coefficients versus time. FIG. 5a shows results obtained with the topology of FIG. 3 and FIG. 5b with the topology of FIG. 4, including the orthogonal control functionality. A comparison between the two Figures shows the importance of the orthogonal control functionality implemented in FIG. 4. In these simulations, a 5-tap adaptive equalizer has been used, and the Ts domain is 2% deviated with respect to the data rate domain. FIGS. 5a and 5b illustrate the gradients of the 5 filter taps. In FIG. 5a the compensation for orthogonal functionality is absent, causing the taps to diverge. On the other hand in FIG. 5b the topology of FIG. 4 was employed, causing the equalizer taps to converge.

Figure 6:
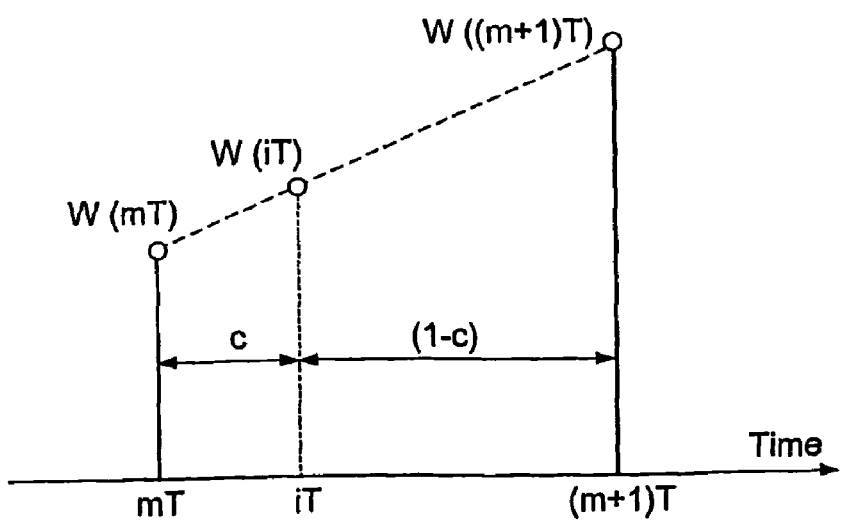
FIG. 6 is a graph illustrating linear interpolation in accordance with a second embodiment of the invention.

Now another issue is addressed in the topology of FIG. 6 relating to a second embodiment of the invention, which applies even when Ts is completely different from T. The filter updates are produced in the data rate domain and are meant for a T-spaced equalizer. However, this filter is Ts-spaced. This topology is thus primarily useful for near-synchronous applications, where Ts differs not too much from T.

Conceptually the calculated T-spaced filter updates need to be converted into the Ts-domain, necessitating an interpolation. FIG. 3 and its related description give details on the spatial interpolator, denoted SI. This interpolator performs a linear interpolation, which is very attractive from a computational point of view.

The re-sampling positions $t_i = iT_s$ can be written as $t_i = (m_i + c_i)T$, where $0 \leq c_i < 1$ and $$m_i = \text{floor}\left(i\frac{T_s}{T}\right) \quad c_i = i\frac{T_s}{T} - m_i$$

As $c_i$ varies between 0 and 1, $t_i$ varies between $m_iT$ and $(m_i+1)T$, and w varies between $w(m_iT)$ and $w((m_i+1)T)$.

According to the linear interpolation as shown in FIG. 6, we get:

$$W(iT_s) = (1-c_i) \cdot w(m_iT) + c_i \cdot w((m_i+1)T)$$

Starting from the basic LMS algorithm:

$$w_{m_i}(k+1) = w_{m_i}(k) - 2 \cdot \mu \cdot \text{sign}(e_k) \cdot x_{k-m_i}$$

Applying the spatial interpolator:

$$\tilde{w}_i(k+1) = (1-c_i) \cdot w_{m_i}(k+1) + c_i \cdot w_{m_i+1}(k+1)$$

Leads to:

$$\tilde{w}_i(k+1) = (1-c_i) \cdot (w_{m_i}(k) - 2 \cdot \mu \cdot \text{sign}(e_k) \cdot x_{k-m_i}) + c_i \cdot (w_{m_i+1}(k) - 2 \cdot \mu \cdot \text{sign}(e_k) \cdot x_{k-m_i-1}) =$$
$$\tilde{w}_i(k) - 2 \cdot \mu \cdot \text{sign}(e_k) \cdot [(1-c_i) \cdot x_{k-m_i-1}] =$$
$$\tilde{w}_1(k) - 2 \cdot \mu \cdot \text{sign}(e_k) \cdot \tilde{x}_{k,1}$$

Time shifts in the impulse response of this new FIR are fully compensated by the timing recovery. As a result the error $e_k$ is independent of the offset in the group delay, which may lead to divergence. In order to have orthogonal control functionality of the timing recovery and the equalizer's adaptation loop, one has to include the results derived in the previous description in relation to FIG. 4.

Figure 7:
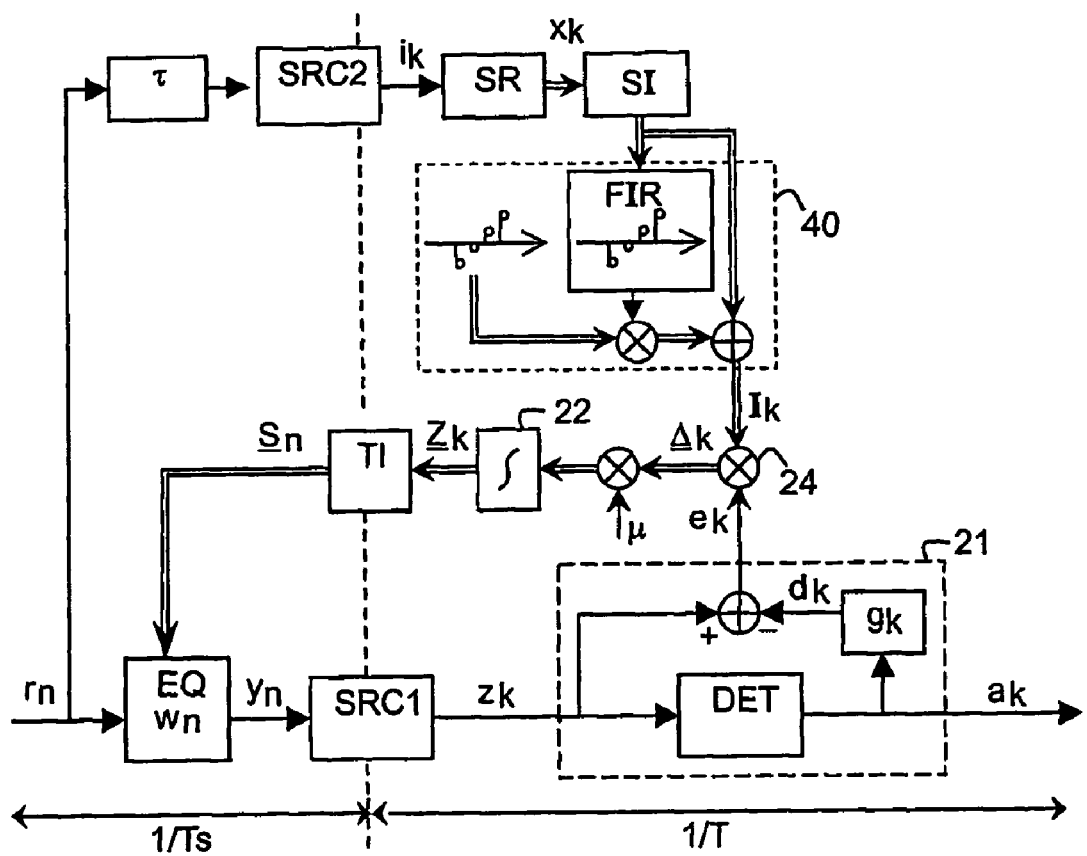
FIG. 7 is a functional block diagram illustrating a receiver topology in accordance with a second embodiment of the invention.

This results in the topology of FIG. 7.

$$\tilde{w}_i(k+1) = \tilde{w}_1(k) - 2 \cdot \mu \cdot \text{sign}(e_k) \cdot [(1-c_i) \cdot x_{k-m_i} + c_i \cdot x_{k-m_i-1}] +$$
$$2 \cdot \mu \cdot \text{sign}(e_k) \cdot i \cdot \frac{\sum_n n[(1-c_n) \cdot x_{k-m_n} + c_n \cdot x_{k-m_n-1}]}{\sum_n n^2}$$

If the spatial interpolator were to be applied to the 'upgraded' version of LMS algorithm, which has the extra term for orthogonal functionality, the equalizer's adaptation loop would still have stability problems. The asynchronous FIR filter would not obey the condition:

$$\sum_k k\tilde{w}_k = 0.$$

This would be due to the fact that the spatial interpolator does not preserve this property when there are at least 5 equalizer taps. One can intuit this easily, for example, for a 5-tap filter one has:

$$\tilde{w}_{-2} = \frac{w_{-2} + w_{-1}}{2}$$

$$\tilde{w}_{-1} = \frac{w_0}{4} + \frac{3 \cdot w_{-1}}{4}$$

$$\tilde{w}_0 = w_0 \quad \text{and} \quad \sum_k kw_k = 0$$

$$\tilde{w}_1 = \frac{w_0}{4} + \frac{3 \cdot w_1}{4}$$

$$\tilde{w}_2 = \frac{w_2 + w_1}{2}$$

$$\sum_k k\tilde{w}_k = -w_{-2} - \frac{5 \cdot w_{-1}}{4} + \frac{5 \cdot w_1}{4} + w_2 \neq 0$$

In order to have an idea of the necessity of the spatial interpolator, DVR simulations are done with ideal signals. In the DVR optical receiver the relation T/Ts amounts to 4/3, leading to an adaptive equalizer with ¾ T spacing.

Figure 8A:
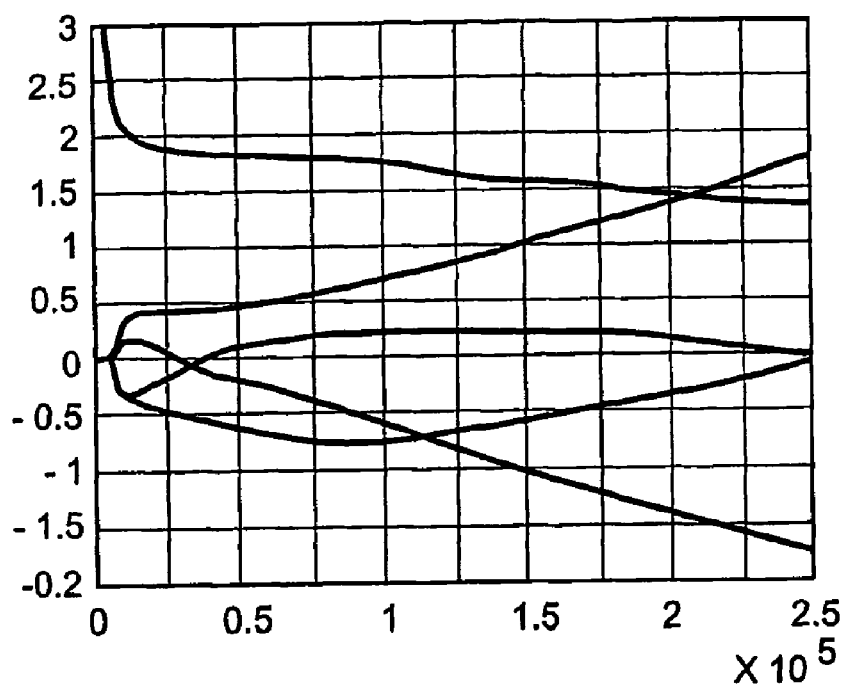
FIG. 8a and FIG. 8b are graphs illustrating simulation results relating to the receiver of FIG. 7.
Figure 8B:
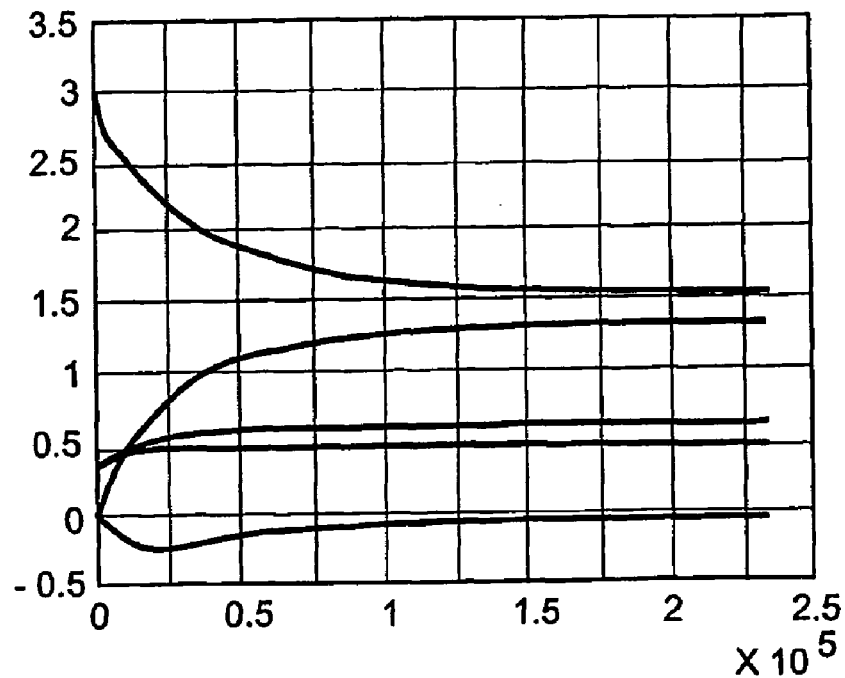

FIG. 8 illustrates simulation results showing the evolution of the FIR coefficients versus time. FIG. 8a shows results obtained with the topology of FIG. 7. In FIG. 8b the spatial interpolator is absent: the T spaced tap updates are connected to the ¾T-spaced equalizer without any conversion. This causes the taps to diverge. In FIG. 8a, on the other hand, the topology of FIG. 7 was employed, which causes the equalizer to converge.

Figure 9:
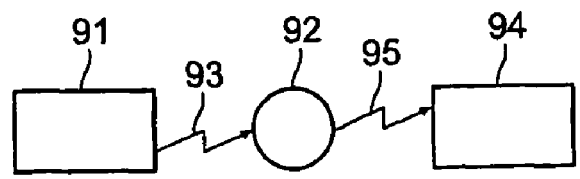
FIG. 9 is a schematic block diagram illustrating a digital system in accordance with the invention.

FIG. 9 shows an example of a system in accordance with the invention comprising a receiver as shown in FIGS. 2, 3, 4 and 7. The system may be, for example, a digital recording system. It comprises a recorder 41 for recording a digital sequence 93 on a recording support 92 and a receiver 94 for reading the recorded sequence 95 from said recording support. The recording support 92 may be, for example, an optical disk.

An interference-free least mean square based asynchronous equalization topology has been described for preventing interference between the timing recovery loop and the equalizer's adaptation loop. Since time-shifts in the impulse response of the FIR filter, which occur as offsets in the group delay, are fully compensated by the timing recovery, the error $e_k$, which drives the filter's adaptation loop, would be independent on the offset in the groupdelay, which may lead to divergence.

It has been described how the interference between the adaptation loops in an asynchronous LMS based equalizer can be avoided. First a condition is derived which provides the asynchronous adaptive equalizer with orthogonal control functionality. Subsequently this constraint is incorporated in the least mean square criterion employing a Lagrange multiplier. This leads to a topology that has cancelled out the interference between the adaptation loops. Finally, this new structure is extended with a spatial interpolator in order to have more flexibility regarding the T/Ts ratio.

Although the invention was described above by way of example with reference to a particular LMS-based asynchronous receiver topology illustrated in FIG. 4 and FIG. 7, this does not limit the scope of the invention. The basic principle of the invention, called the "orthogonal control functionality", is also applicable to any LMS-based asynchronous receiver topology having a timing recovery loop and an adaptive equalizer's adaptation loop. The basic principle of the invention is the solution for avoiding interference between the timing recovery loop and the equalizer's adaptation loop, where the equalizer is placed in the asynchronous domain. This solution, described with reference to FIG. 4 and FIG. 7, is in this case calculated for the LMS-based control but may in fact also be calculated for a zero forcing control. The solution consists of altering the adaptation algorithm such that the condition for interference-free working of the system is fulfilled.

The drawings and their description hereinbefore illustrate rather than limit the invention. It will be evident that there are numerous alternatives which fall within the scope of the appended claims. In this respect, the following closing remarks are made. There are numerous ways of implementing functions by means of items of hardware or software, or both. In this respect, the drawings are very diagrammatic, each representing only one possible embodiment of the invention. Thus, although a drawing shows different functions as different blocks, this by no means excludes either that a single item of hardware or software carries out several functions, or that a function can be carried out by an assembly of items of hardware or software, or both.

The invention claimed is:

1. A receiver for delivering a data sequence ($a_k$) at a data rate 1/T from a received sequence ($r_n$) sampled at a clock rate 1/Ts, asynchronous to the data rate 1/T, the receiver comprising:
   an adaptive equalizer (EQ) for delivering an equalized sequence ($y_n$) from said received sequence ($r_n$), said equalizer operating at the clock rate 1/Ts and being controlled via an equalizer's adaptation loop,
   a sampling rate converter (SRC1) for converting said equalized sequence ($y_n$) into an equivalent input sequence ($x_k$) to be provided to an error generator (21) at the data rate 1/T via a timing recovery loop,
   an error generator (21) for delivering, from said input sequence ($x_k$), the data sequence ($a_k$) and an error sequence ($e_k$) to be used in both loops,
   orthogonal control functionality means (40) for deriving a condition for the adaptive equalizer (EQ) to fulfill in order to decrease interference between said equalizer's adaptation loop and said timing recovery loop.

2. A receiver as claimed in claim 1, wherein the control loop further comprises spatial conversion means (SI) for converting a given initially T-spaced sequence generated within the control loop into an equivalent Ts-spaced sequence for controlling said equalizer coefficient vector ($W_n$).

3. A receiver as claimed in claim 2, wherein said spatial conversion means (SI) are arranged to perform a linear interpolation.

4. A receiver as claimed in claim 2, wherein said spatial conversion means (SI) are arranged to perform a nearest-neighbor interpolation.

5. A digital system comprising a transmitter for transmitting a digital sequence via a channel support and a receiver for extracting said digital sequence from said channel support, wherein said receiver is a receiver as claimed in claim 1.

6. In a receiver comprising an adaptive equalizer, an equalizer adaptation method of receiving a sequence ($r_n$), sampled at a clock rate 1/Ts, and of delivering a data sequence ($a_k$) at a data rate 1/T, the method comprising the following steps:
   an adaptive equalizing step of delivering an equalized sequence ($y_n$) from the received sequence ($r_n$) using an equalizer coefficient vector ($W_n$) in a control loop,
   a first sampling rate converting step (SRC1) of converting said equalized sequence ($y_n$) into an equivalent input sequence ($x_k$) to be processed through an error generating step (21) at the data rate 1/T within a timing recovery loop,
   an error generating step (21) of generating, from said input sequence ($x_k$), the data sequence ($a_k$) and an error sequence ($e_k$) at the data rate 1/T to be used in both loops,
   a step of generating a control vector sequence ($S_n$) from the error sequence ($e_k$) and the received sequence ($r_n$), for controlling said equalizer coefficient vector ($W_n$),
   an orthogonal control step (40) for deriving a condition for the adaptive equalizer to fulfill in order to decrease interference between said control loop and the timing recovery loop.

7. A computer program product for a receiver computing a set of instructions which when loaded into the receiver, causes the receiver to carry out the method as claimed in claim 6.

8. A signal for carrying a computer program, the computer program being arranged to carry out the method as claimed in claim 6.

* * * * *